Patented Aug. 20, 1935

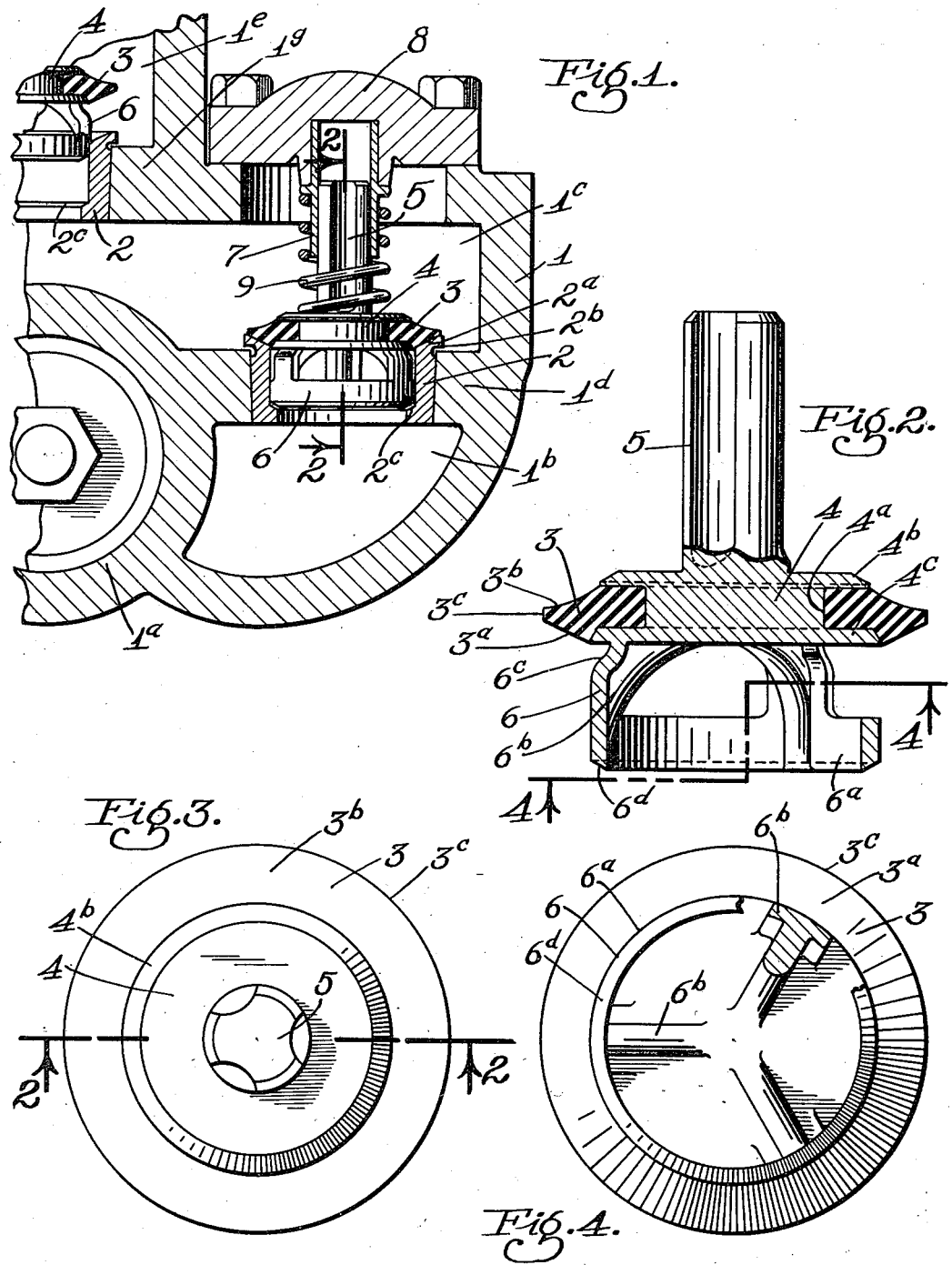

2,011,740

UNITED STATES PATENT OFFICE 2,011,740

PUMP VALVE

Max L. Vallendor, Walnut Park, and Paul C. Fly, Ventura, Calif.

Application March 23, 1931, Serial No. 524,688

1 Claim. (Cl. 251—144)

Our present invention relates to valves, or valve construction, particularly adapted for certain types of pumps or similar construction.

The objects of this invention are: first, to provide a valve structure which is particularly adapted for or effective in slush or mud pumps used in connection with oil wells and other similar purposes; second, to provide a valve which is readily yieldable and which will form an effective seal between itself and the seat adapted to be engaged by the valve, against the passage of fluids, liquids, or viscous substances, even though solid particles are caught between the valve and its seat when the valve is closed; third, to provide a valve structure of this class having a yieldable valve member and a positive stop which is cushioned by the yieldable valve member and by the portion only of the valve member which engages the seat, or the portion which effects the seal; fourth, to provide a valve structure of this class in which the yieldable valve member, which is usually made of rubber, cannot be forced to any appreciable extent beyond the valve seat irrespective of the high pressures often employed in connection with valves of this class and in which the fluid pressures force the yieldable valve members against their respective seats, thus reducing to a minimum the cutting or chewing or other deterioration of the yieldable valve member; fifth, to provide a valve member of yieldable material in connection with a valve structure of this class which valve member is beveled at its periphery to a substantially thin edge, which construction permits the peripheral portion of the valve member to be distorted when solid particles, such as stones and pieces of metal and the like, are caught between the valve member and its seat, and at the same time permits the portions of the valve member surrounding the foreign or solid particles to be forced tightly against and in sealing relation with respect to its seat; sixth, to provide a valve structure of this class in which the yieldable valve member is held tightly in position but which at the same time permits considerable distortion in case of wear of the stop or limit means, providing an effective seal at all times, and even if the stop or limit means should break; seventh, to provide a novel and simple cage in connection with a valve of this class for guiding the valve member in its movements with respect to its seat, which cage also serves as an element of the stop means, and which cage is so constructed as to allow a maximum of pumped substance, and which is also so constructed that solid particles cannot be readily lodged between the seat and the valve member support or the cage in connection therewith; eighth, to provide a valve structure of this class in which the yieldable valve member is, under normal operation, never subjected to great strains, and which will, under normal conditions, outwear other metal parts of the valve; and, ninth, to provide as a whole a novelly constructed valve of this class, one which is very durable, efficient, easily replaceable and which as a whole will not readily deteriorate or get out of order.

With these and other objects in view as will appear hereinafter, we have devised a pump valve having certain novel features of construction, combination and arrangement of parts and portions, as will be hereinafter described in detail and particularly set forth in the appended claim, reference being had to the accompanying drawing and to the characters of reference thereon which form a part of this application in which:

Figure 1 is a fragmentary sectional view of a slush pump of a type in common use, with the section taken transversely with respect to the cylinder and through the valve thereof, and with our valves incorporated therein; Fig. 2 is an enlarged partial elevational and partial sectional view of the valve member itself with the section taken through 2—2 of Fig. 1 and also through 2—2 of Fig. 3; Fig. 3 is an end view thereof taken from the stem end; and, Fig. 4 is another end view thereof taken from the opposite end and shown partially in section with the view taken at 4—4 of Fig. 2.

Like characters of reference refer to similar parts and portions throughout the views of the drawing.

In Fig. 1 of the drawing, the pump housing is designated generally by 1, and is provided with a cylinder 1a, an intake chamber 1b, a compression chamber 1c, a wall 1d separating the latter chamber, a discharge chamber 1e, and a wall 1g separating the latter chamber from the compression chamber.

In each of the separating walls 1d and 1g is mounted a valve seat member 2 which is generally cylindrical in construction but tapered at the outside and positioned in the usual tapered recesses in the separating walls. At the upper end of the valve seat member is provided an inwardly and downwardly beveled valve seat 2a which is preferably relatively wide, the outer diameter of the valve seat being extended by an annular outwardly extending flange 2b at the upper end of the valve seat member.

Upon the valve seat 2a is adapted yieldably to be seated the yieldable valve member 3. This valve member is supported by a supporting member 4 in the form of a disc. Extending from one side of the disc and coaxial therewith is a valve stem 5, and extending from the other side of the disc and coaxial therewith is a cage 6. The cage is reciprocally mounted within and against the inside wall of the cylindrical valve seat member 2, while the valve stem 5 is guided by and within a sleeve 7 which is fitted and retained at its upper end in a removable head 8. The supporting member or portion 4 forms preferably an integral part with the stem and the cage and is provided in its periphery with an annular groove 4a in which is positioned the inner or central portion of the valve member 3 and retained therein by the axially spaced apart walls or flanges 4b and 4c forming the opposite sides of the grooves.

The valve member 3, which is preferably made of rubber, is generally disc-like, though of annular construction. The lower side of the valve member 3, extending beyond the lower flange 4c, is beveled upwardly, as indicated by 3a. The upper side of the valve member, outwardly from the upper flange 4b is beveled downwardly, as indicated by 3b, forming a valve member having a relatively thin edge 3c at its periphery. The beveled portion 3a conforms with and is adapted to seat upon the valve seat 2a.

It will be here noted that the lower flange 4c substantially fills the space at the upper end of the valve seat member when the yieldable valve member is seated, there being preferably provided only sufficient clearance between the periphery of the flange 4c and the inner wall of the valve seat member to allow free movement of the former in the latter. The upper flange 4b is of less diameter than the lower flange which permits the supporting member 4 to be lowered considerably below the normal valve seating position of the yieldable valve member in case of wear of the stop means or in case of breakage thereof, thus permitting considerable distortion of the peripheral portion of the yieldable valve member and still permit engagement and sealing thereof with the valve seat.

The cage 6, as shown, consists of an annular portion 6a at its lower end which annular portion is connected to the lower side of the supporting portion 4 and particularly the lower flange 4c thereof. The upper ends of the arms 6b, at their connection with the flange 4c, are turned inwardly, as indicated by 6c, to provide clearance in case solid particles are lodged between the valve seat and the valve member immediately opposite the arms 6b.

The cage 6, in addition to forming a guide for the lower end of the valve also serves as a stop means for limiting the position of the supporting member 4 with respect to the valve seat. When performing the function of the stop means, the lower edge 6d engages an annular shoulder 2c at the lower end of the valve seat member, the shoulder being formed by an inwardly extending flange at said lower end of the valve seat member. Both the lower edge 6d of the annular portion 6a and the annular shoulder 2c are beveled inwardly and downwardly so that the constant hammering of the valve member against the shoulder of the valve seat member will tend to turn the metal toward the center.

The valve stem 5 is preferably longitudinally fluted to avoid resistance when the valve member is forced from its seat.

The valve member is normally urged against its seat by a compression spring 9 positioned around the stem and the lower end of the sleeve 7 and between a shoulder on the sleeve and the upper flange 4b of the valve member support.

The cage 6, which guides the valve at the lower end, is relatively large and therefore the wear in guiding the lower end of the valve in its reciprocal movement is reduced to a minimum. However, both the valve member and the valve seat member may be easily removed by removing the head 8.

The yieldable valve member 3 is urged against the valve seat by the spring 9 but with the stop portion of the cage in disengaged relation with the shoulder 2c. However, when the pump is in operation, the tremendous pressure in the compression chamber 1c and on the discharge side 1e forces the whole valve member toward the seat member and the stop portion 6d against the shoulder 2c. The valve member 3 being yieldable forms a cushion for the stop. The tremendous pressure forces the yieldable valve member against the valve seat but, because the space between the valve seat member and the flange 4c is very small, the yieldable valve member cannot be forced between the valve seat member and said flange, thus preventing cutting or other deterioration of the portion of the yieldable valve member extending outwardly from the lower flange 4c. The tremendous pressure against the upper side of the yieldable valve member will force the same against the valve seat even though particles of stone, metal, or other matter are lodged between the valve seat and the yieldable valve member.

Though we have shown and described a particular construction, combination and arrangement of parts and portions of our pump valve and a particular application thereof to a mud or slush pump, we do not wish to be limited to this particular construction, combination and arrangement, nor to the particular application, but desire to include in the scope of our invention the construction, combination and arrangement substantially as set forth in the appended claim.

Having thus described our invention, what we claim as new and desire to secure by Letters Patent is:

In a pump valve structure, a cylindrical valve seat member, a beveled valve seat at one end, a guide portion coaxial with and extending inwardly from said seat and a valve stop at the inner end of the guide portion, said valve stop being beveled convergingly inwardly, and a valve member reciprocally mounted with respect to the valve seat member, said valve member comprising a beveled flexible valve portion adapted to engage said seat, and a cage at the inner side of the valve portion and reciprocally mounted in said guide portion, the inner end of said cage being beveled convergingly inwardly and adapted to engage the stop portion of said valve seat member.

MAX L. VALLENDOR.
PAUL C. FLY.